United States Patent
Chang

(10) Patent No.: US 12,149,098 B2
(45) Date of Patent: Nov. 19, 2024

(54) WIRELESS ENERGY TRANSMISSION DEVICE AND SYSTEM COMPRISING THE SAME

(71) Applicant: NANJING SILERGY MICRO (HK) CO., LIMITED, Causeway Bay (HK)

(72) Inventor: Chia-Lin Chang, Causeway Bay (HK)

(73) Assignee: Nanjing Silergy Micro (HK) Co., Ltd., Causeway Bay (HK)

( * ) Notice: Subject to any disclaimer, the term of this patent is extended or adjusted under 35 U.S.C. 154(b) by 663 days.

(21) Appl. No.: 17/396,797

(22) Filed: Aug. 9, 2021

(65) Prior Publication Data

US 2022/0069630 A1 Mar. 3, 2022

(30) Foreign Application Priority Data

Aug. 25, 2020 (CN) .......................... 202010864277.4

(51) Int. Cl.
*H01M 10/46* (2006.01)
*H01Q 13/16* (2006.01)
*H02J 50/00* (2016.01)
*H02J 50/23* (2016.01)
*H02J 50/40* (2016.01)

(52) U.S. Cl.
CPC ............. *H02J 50/23* (2016.02); *H01Q 13/16* (2013.01); *H02J 50/005* (2020.01); *H02J 50/40* (2016.02)

(58) Field of Classification Search
CPC ........ H02J 7/0042; H02J 50/23; H02J 50/005; H02J 50/40; H02J 50/20; H01Q 13/16; H01Q 1/38; H01Q 1/50

USPC .......................... 320/107, 108, 114; 307/104
See application file for complete search history.

(56) References Cited

U.S. PATENT DOCUMENTS

| 7,843,288 | B2 | 11/2010 | Lee et al. | |
| 10,355,367 | B2 * | 7/2019 | Henry | H01Q 13/02 |
| 2014/0375519 | A1 * | 12/2014 | Ko | H01Q 1/243 |
| | | | | 343/817 |
| 2019/0097301 | A1 * | 3/2019 | Wu | H01Q 19/062 |
| 2020/0280131 | A1 * | 9/2020 | Avser | H01Q 21/061 |

FOREIGN PATENT DOCUMENTS

| CN | 210668679 U | 6/2020 | |
| CN | 116666940 A * | 8/2023 | ....... H01L 23/49816 |
| WO | WO-2021000732 A1 * | 1/2021 | ............... H01Q 1/22 |

OTHER PUBLICATIONS

First Chinese Office Action, Translation, Apr. 28, 2024.

* cited by examiner

*Primary Examiner* — Edward Tso

(57) ABSTRACT

A wireless energy transmission device and system. The wireless energy transmission device comprises a substrate, a feed layer and dielectric resonant component. The feed layer is formed on the substrate and has a signal feed-in part and an antenna part formed on the feed layer. Wherein an signal feed-in part is used to introduce the energy transmission signal and the energy transmission signal is emitted by the antenna part. The dielectric resonant component is disposed on the feed layer, and the dielectric resonant component covers the antenna part.

16 Claims, 5 Drawing Sheets
(2 of 5 Drawing Sheet(s) Filed in Color)

WIRELESS ENERGY TRANSMISSION DEVICE AND SYSTEM COMPRISING THE SAME

RELATED APPLICATIONS

The present application claims the priority of Chinese Application No. 202010864277.4, filed Aug. 25, 2020, the disclosure of which is hereby incorporated by reference herein in its entirety.

BACKGROUND OF THE INVENTION

1. Field of the Invention

The present disclosure generally relates to a wireless energy transmission device and a system comprising the same, and, more particularly, to a wireless energy transmission device and a system comprising the same used for wireless charging.

2. Description of the Related Art

At present, mobile devices, such as mobile phones, wireless headsets, etc., can be charged by wireless charging systems. A wireless charging system includes a mobile device as an energy receiving end and a wireless charging pad as an energy transmitting end. There are corresponding charging coils disposed in the mobile device and the wireless charging pad for wireless charging.

However, in the conventional wireless charging system, the mobile device must be accurately placed in a specific position on the wireless charging pad. Otherwise, the charging coil of the mobile device cannot be successfully paired with the charging coil of the wireless charging pad, resulting in failure in charge. Therefore, how to provide a wireless energy transmission device and a system comprising the same that can charge a mobile device wirelessly without precise placement has become an urgent problem to be solved in the industry.

SUMMARY OF THE INVENTION

In light of solving the foregoing problems of the prior art, the present invention provides a wireless energy transmission device and system that can perform wireless charging without precise placement. The wireless energy transmission device according to the present invention comprises a substrate, a feed layer and dielectric resonant component. The feed layer is formed on the substrate and has a signal feed-in part and an antenna part formed on the feed layer. Wherein the signal feed-in part is used to introduce an energy transmission signal and the energy transmission signal is emitted by the antenna part. The dielectric resonant component is disposed on the feed layer, and the dielectric resonant component covers the antenna part.

In an embodiment, the substrate has a transmittance of between 50% and 95%.

In an embodiment, the feed layer has a transmittance of between 50% and 95%.

In an embodiment, the dielectric resonant component has a transmittance of between 50% and 95%.

In an embodiment, the substrate is made of glass, crystal glass or acrylic.

In an embodiment, the feed layer is made of metal grid, ITO, graphene film or sputtered thin metal film.

In an embodiment, the dielectric resonant component is made of glass, crystal glass or acrylic.

In an embodiment, the signal feed-in part further comprises a first slot and a second slot, and the first slot and the second slot are substantially symmetrical to each other.

In an embodiment, the antenna part further comprises a third slot and a fourth slot, and the third slot and the fourth slot are substantially symmetrical to each other.

In an embodiment, the first slot, the second slot, the third slot and the fourth slot each has a cross-sectional area which is rectangular, the first slot is orthogonal to the third slot, and the second slot is orthogonal to the fourth slot.

In an embodiment, the dielectric resonant component has a shape of a cube, a cuboid, a cylinder, a half cylinder, a hollow cuboid or a hollow cylinder.

In an embodiment, a contact area between the dielectric resonant component and the feed layer is rectangular or circular.

In an embodiment, the antenna part substantially corresponds to a center position of the contact area between the dielectric resonant component and the feed layer.

In an embodiment, the dielectric resonant component has a dielectric constant of between 2 and 10.

The present invention also provides a wireless energy transmission system comprising a wireless energy transmission device according to any one of said embodiments and a power supply device. The power supply device is coupled to the signal feed-in part and used to send the energy transmission signal to the signal feed-in part.

In an embodiment, the wireless energy transmission system further comprises an energy receiving device. The energy receiving device is coupled to the wireless energy transmission device and charged through an electromagnetic field produced by the wireless energy transmission device.

Compared to the prior art, CPW (coplanar waveguide) can be fabricated by the signal feed-in part and the antenna part on the feed layer of the wireless energy transmission device according to the present invention. The CPW is used to introduce and convey an energy transmission signal and produce an electromagnetic field. The wireless energy transmission device of the present invention can further adjust the antenna radiation gain pattern through the dielectric resonant component, so that the areas with higher gain would be concentrated in the space above the substrate. Therefore, the wireless charging can be performed by placing the energy receiving device above the wireless energy transmission device, and there is no need to pair the coils in the mobile device and the wireless charging pad as the wireless charging systems in the prior art do. In addition, the substrate, the feed layer, and the dielectric resonator component of the wireless energy transmission device of the present invention can all be made of light-transmitting materials, which is more beautiful and may enhance the design flexibility of the appearance of the wireless energy transmission device.

BRIEF DESCRIPTION OF THE DRAFLAPS

The patent or application file contains at least one drawing executed in color. Copies of this patent or patent application publication with color drawing(s) will be provided by the Office upon request and payment of the necessary fee.

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

Figure 1:
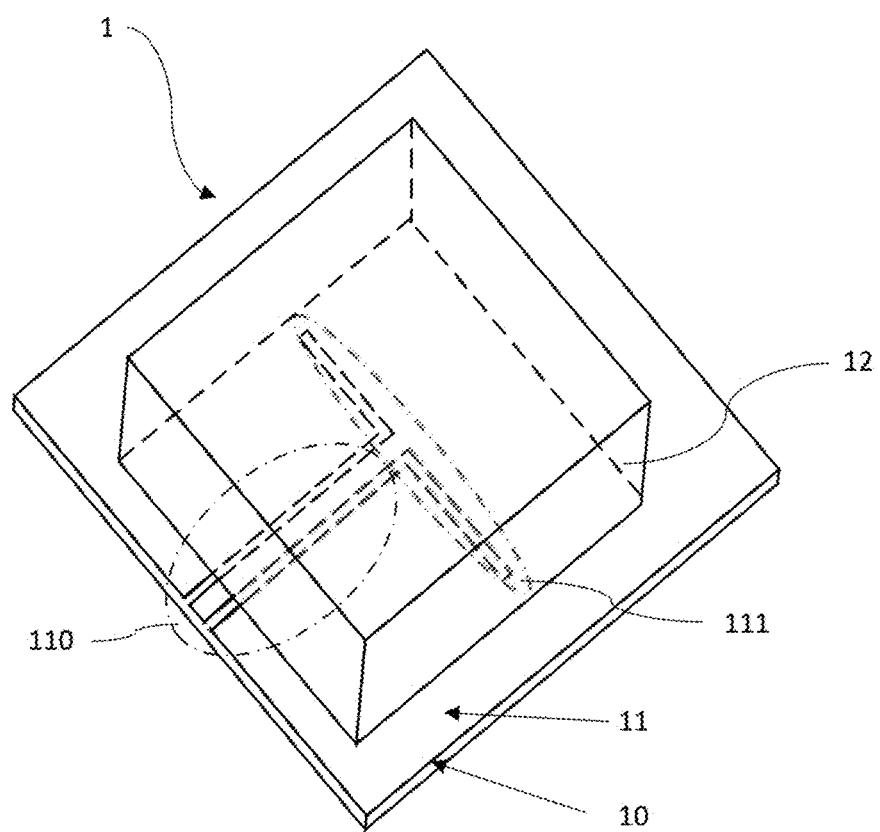
FIG. 1 illustrates a schematic view of a structure of the wireless energy transmission device according to a first embodiment of the present invention.

Please refer to FIG. 1. FIG. 1 illustrates a schematic view of a structure of the wireless energy transmission device according to a first embodiment of the present invention. As shown in the figure, the wireless energy transmission device 1 according to the present invention comprises a substrate 10, a feed layer 11 and dielectric resonant component 12. The feed layer 11 is formed on the substrate 10 and the feed layer 11 is thinner than the substrate 10. A signal feed-in part 110 and an antenna part 111 are formed on the feed layer 11 (respectively shown by dashed circles in the figure). Wherein, the signal feed-in part 110 is used to introduce the energy transmission signal and the energy transmission signal is emitted by the antenna part 111.

The dielectric resonant component 12 is disposed on the feed layer 11. In this embodiment, the dielectric resonant component 12 has a shape of a cuboid, and in other embodiments, the dielectric resonant component 12 may be in other shapes. The dielectric resonant component 12 may cover the antenna part 111 and may also cover part of the feed-in part 110.

In an embodiment of the present invention, in addition to the feed layer 11 formed on the substrate 10, the substrate 10 may also comprise an adhesive or adhesive layer (such as optical adhesive or OCA adhesive) for bonding, and a protective layer (such as PET/PI) or UV adhesive or the like for protection, but not limited thereto.

In an embodiment, the feed layer 11 is made of electrically conductive materials. The area where the signal feed-in part 110 and the antenna part 111a re formed and its periphery may be used as an electrically active area to fabricate a coplanar waveguide. One end of the signal feed-in part 110 is disposed on an edge of the feed layer 11. The signal feed-in part 110 is used to introduce the energy transmission signal and the energy transmission signal is emitted by the antenna part 111 to produce an electromagnetic field. In a further embodiment, the rest area of the feed layer 11 other than the electrically active area may be used as a non-electrically active area.

Figure 2:
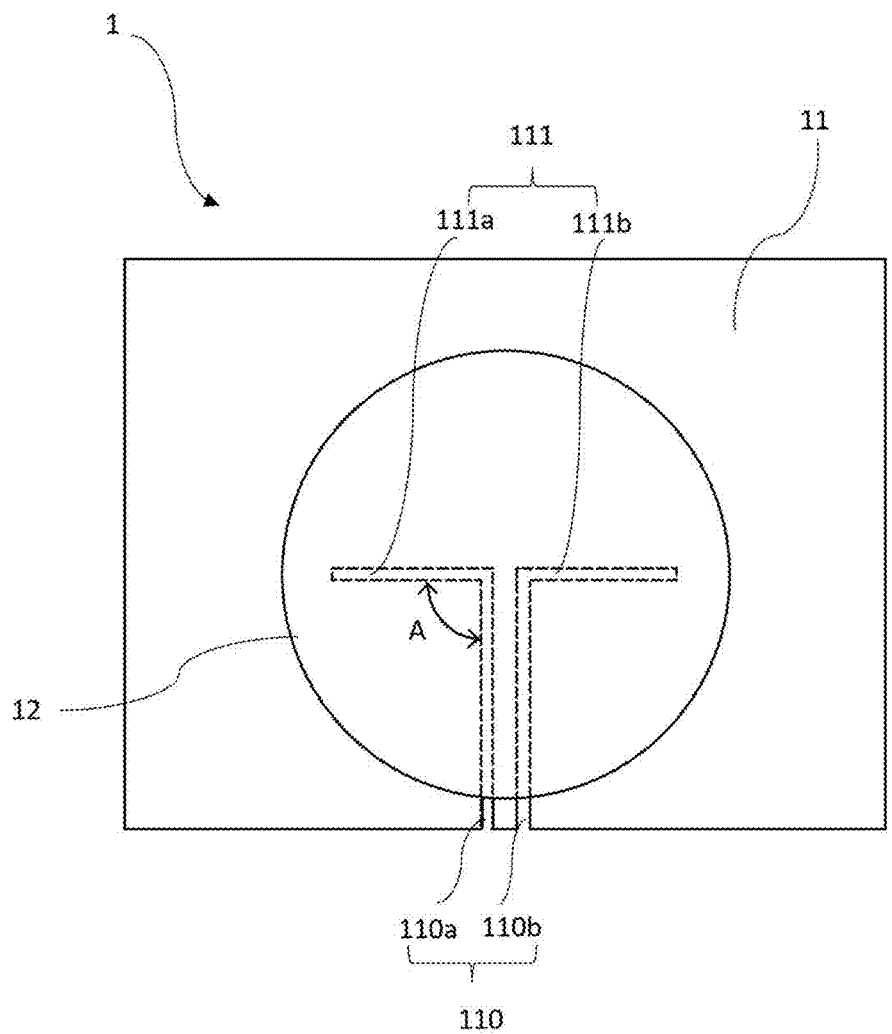
FIG. 2 illustrates a schematic plan view of the wireless energy transmission device according to the second embodiment of the present invention.

Please refer to FIG. 2. FIG. 2 illustrates a schematic plan view of the wireless energy transmission device according to the second embodiment of the present invention. In an embodiment, the signal feed-in part 110 may comprise a first slot 110a and a second slot 110b. The first slot 110a and the second slot 110b are substantially symmetrical to each other.

In an embodiment, the antenna part 111 may comprise a third slot 111a and a fourth slot 111b. The third slot 111a and the fourth slot 111b are substantially symmetrical to each other.

In the embodiment, the dielectric resonant component 12 may cover the third slot 111a and the fourth slot 111b of the antenna part 111 and may also cover part the first slot 110a and part of the second slot 110b of the feed-in part 110.

In an embodiment, the first slot 110a, the second slot 110b, the third slot 111a and the fourth slot 111b each has a cross-sectional area which may be rectangular, but not limited thereto. The first slot 110a is orthogonal to the third slot 111a, and the second slot 110b is orthogonal to the fourth slot 111b. The first slot 110a, the second slot 110b, the third slot 111a, and the fourth slot 111b can be formed by hollowing out or etching the feed layer 11. The energy transmission signal is transmitted by the electrically conductive feed layer 11 at the edges of the first slot 110a, the second slot 110b, the third slot 111a, and the fourth slot 111b.

When the areas of the first slot 110a and the third slot 111a are fixed, the ability of the antenna to emit the energy transmission signal of the would be greater with the first slot 110a and the third slot 111a intersecting at an angle A of about 90 degrees. However, the first slot 110a and the third slot 111a may intersect at angle A between 0 degrees and 180 degrees in other embodiments. Due to the mutual symmetry, the intersection angle between the second slot 110b and the fourth slot 111b is equal to angle A.

In an embodiment, the length of the third slot 111a and the fourth slot 111b of the antenna portion 111 can be adjusted according to the guiding wavelength.

In an embodiment, the dielectric resonant component 12 may have a shape of a cube, a cuboid, a cylinder, a half cylinder, a hollow cuboid or a hollow cylinder, but not limited thereto. The dielectric resonator component 12 in FIG. 2 is in a shape of solid cylinder (only the top plan view is shown in the figure). The coplanar waveguide fabricated by the dielectric resonat component 12 and the feed layer 11 may further form a dielectric resonant antenna. The dielectric resonant antenna can produce an electromagnetic field of a TE11 pattern and increase the radiation gain, so that the area with higher gain may be concentrated in the space above the substrate 10. Therefore, wireless charging can be performed as long as the energy receiving device (i.e. the mobile device) is placed above the wireless energy transmission device 1 according to the present invention. Furthermore, the angle at or the direction in which the energy receiving device is placed on the wireless energy transmission device is not limited, and multiple energy receiving devices can be charged at the same time by the wireless energy transmission device of the present invention. In other words, no matter how the energy receiving device is placed on/above the wireless energy transmission device (at any angle or in any direction), the energy receiving device can be charged by the wireless energy transmission device of the present invention.

In an embodiment, a contact area between the dielectric resonant component 12 and the feed layer 11 may be rectangular when the dielectric resonant component 12 is in a shape of a cube, a cuboid, a half cylinder, a hollow cuboid, etc. or circular when the dielectric resonant component 12 is in a shape of a cylinder, a hollow cylinder, etc.

In an embodiment, the antenna part 111 may substantially correspond to a center position of the contact area between the dielectric resonant component 12 and the feed layer 11. In this way, a better radiation gain can be obtained.

Figure 3:
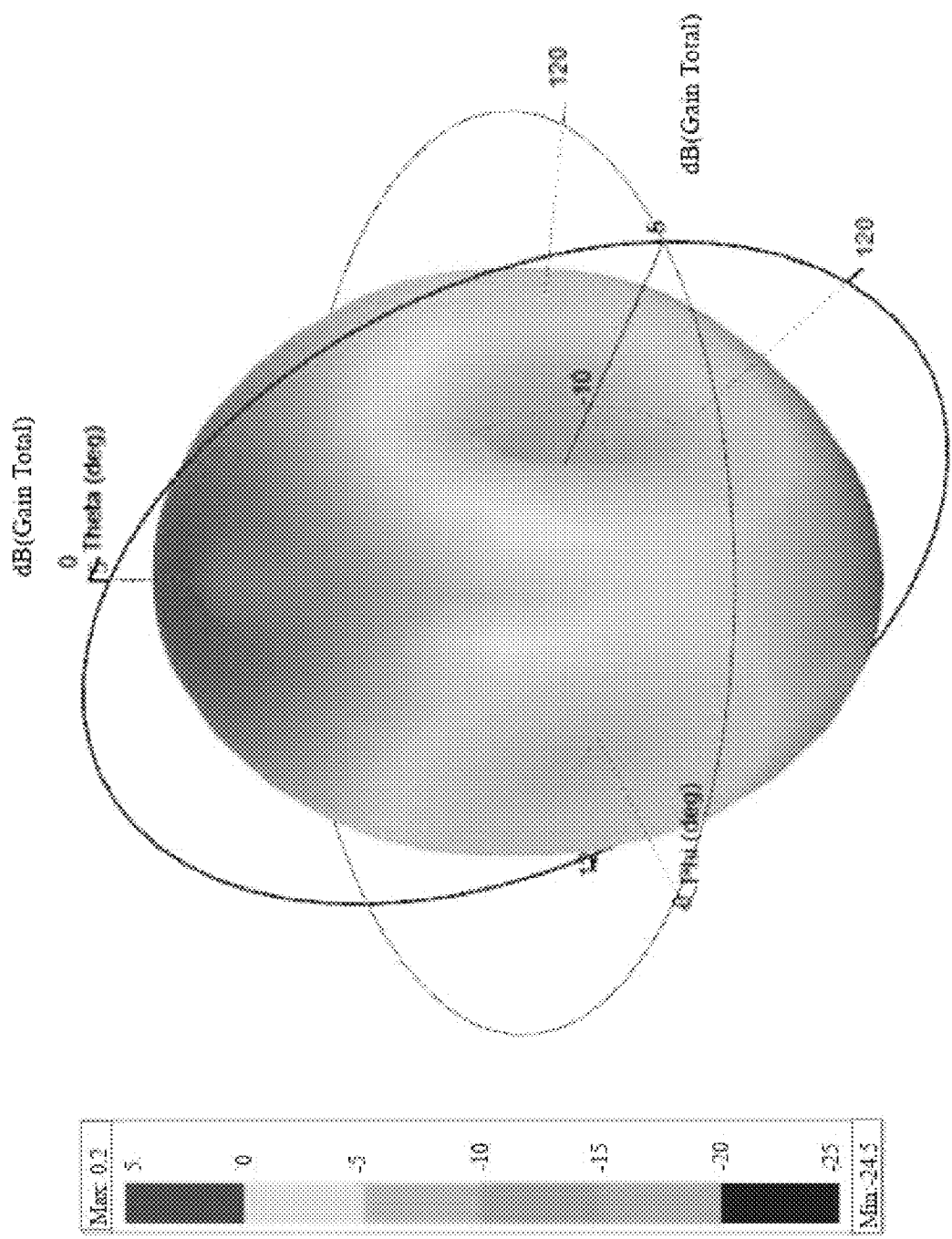
FIG. 3 illustrates an antenna radiation gain pattern of a general coplanar waveguide fabricated by a wireless energy transmission device without a dielectric resonator component.

Please refer to FIG. 3. FIG. 3 illustrates an antenna radiation gain pattern of a general coplanar waveguide. The coplanar waveguide shown in FIG. 3 is fabricated by a wireless energy transmission device with a feed layer having a signal feed-in part and an antenna part according to the present invention, but without a dielectric resonator component in it. The areas with higher gain of the antenna radiation gain pattern would be scattered in the space above and below the substrate as shown in FIG. 3. Furthermore, the gain is low. In this embodiment, the maximum gain is as high as about 0.2 dB.

Figure 4:
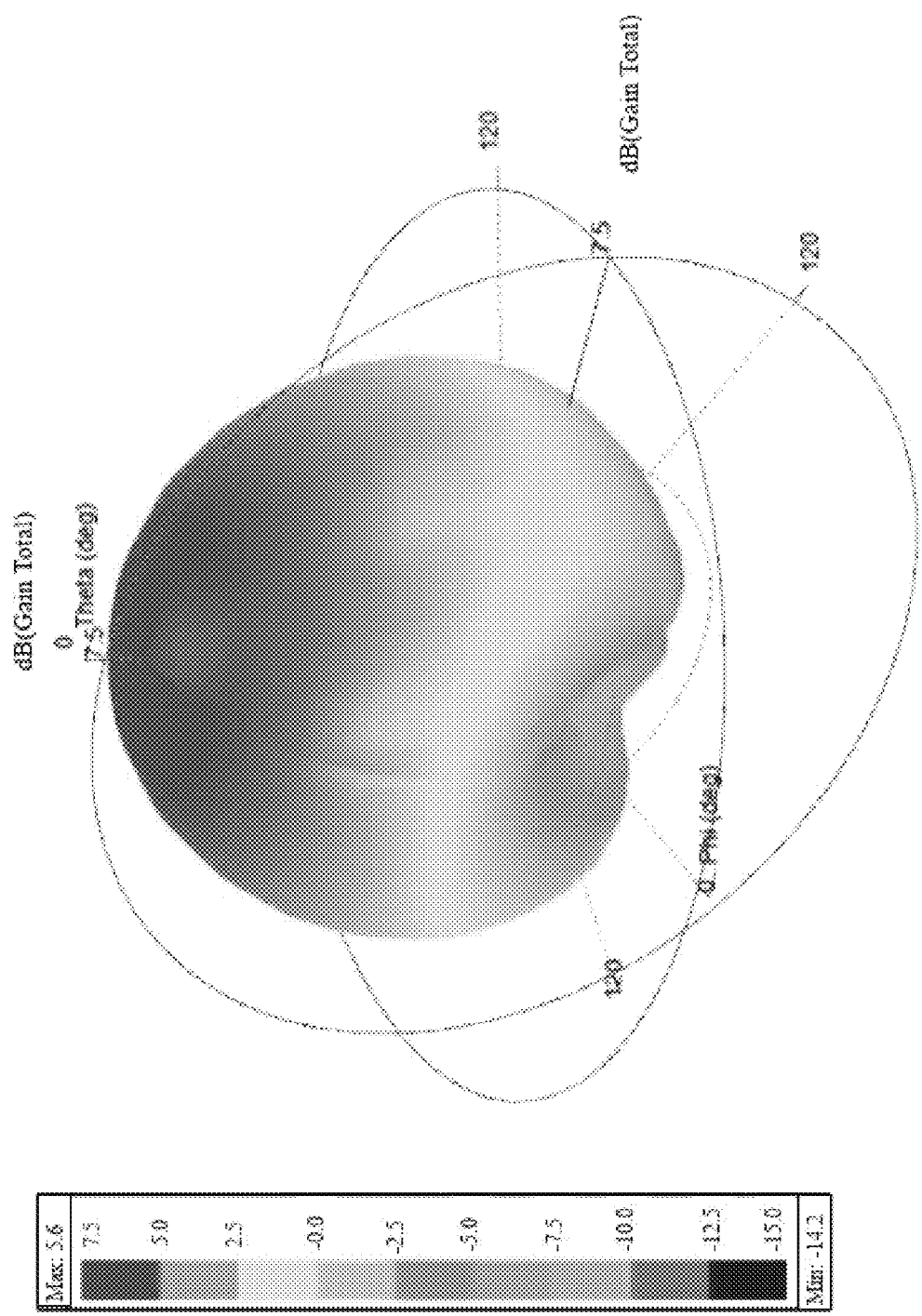
FIG. 4 illustrates an antenna radiation gain pattern of a coplanar waveguide fabricated by a wireless energy transmission device with a dielectric resonator component according to an embodiment of the present invention.

Please refer to FIG. 4. FIG. 4 illustrates an antenna radiation gain pattern of a coplanar waveguide fabricated by a wireless energy transmission device with a dielectric resonator component according to an embodiment of the present invention. The coplanar waveguide shown in FIG. 4 is fabricated by the wireless energy transmission device with a dielectric resonant component (such as the dielectric resonant component 12 according to the present invention) added above the substrate. The areas with higher gain of the antenna radiation gain pattern would be concentrated in the space above the substrate. Furthermore, the gain is high. In this embodiment, the maximum gain is as high as about 5.6 dB. Therefore, wireless charging can be performed as long as the energy receiving device is roughly placed in the area with higher gain. It is more flexible and convenient to charge the mobile devices wirelessly by the wireless energy transmission device of the present invention.

In an embodiment, the substrate 10 can have a transmittance of between 50% and 95%. The feed layer 11 can have a transmittance of between 50% and 95%. The dielectric resonant component 12 can have a transmittance of between 50% and 95%. The substrate 10, the feed layer 11, or the dielectric resonant component 12 may have the same or different transmittance, and it is not limited herein. In the present invention, the design of a wireless energy transmission device with a substrate 10, a feed layer 11 and a dielectric resonant component 12 each having a transmittance between 50% and 95% would be more beautiful, and it also has greater design flexibility of the appearance of the wireless energy transmission device. Furthermore, the wireless energy transmission device 1 may be further equipped with a power supply. If the power supply device is a photoelectric conversion device, the design which allows the transmission of light waves through it will not shield the light source for the photoelectric conversion device.

In an embodiment, the substrate 10 is made of glass, crystal glass or acrylic, but not limited thereto.

In an embodiment, the feed layer 11 is made of metal grid, ITO, graphene film or sputtered thin metal film. Preferably, the feed layer 11 is made of a material with square resistance less than 2 ohm, but not limited thereto. For example, the metal grid can made of silver nanowire or copper nanowire. In order to keep the overall visual transmittance of the feed layer 11 consistent, the metal grids in different regions, such as the electrically active area and the non-electrically active area, can have different spaces.

In an embodiment, the dielectric resonant component 12 is made of glass, crystal glass or acrylic, but not limited thereto. In addition, the dielectric resonant component 12 can have a dielectric constant of between 2 and 10, but not limited thereto. Since the dielectric constant of the material may affect the thickness of the dielectric resonator component 12, the dielectric resonant component with a dielectric constant in a range of 2 and 10 may have an more expected thickness and a transmittance for a preferred embodiment of the present invention.

Figure 5:
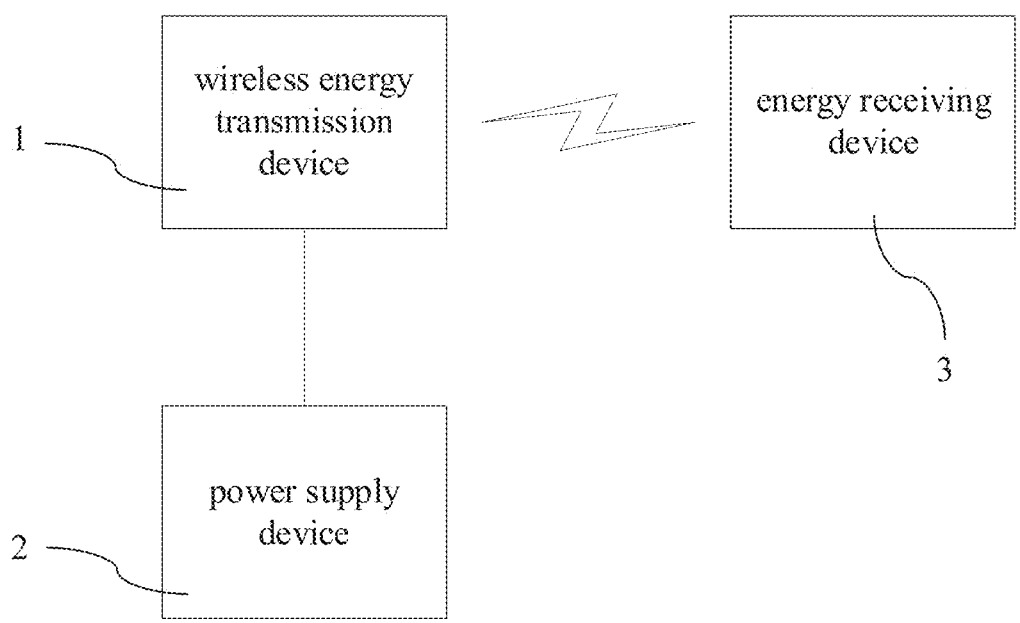
FIG. 5 illustrates a schematic view of a structure of the wireless energy transmission system according to a third embodiment of the present invention.

Please refer to FIG. 5. FIG. 5 illustrates a schematic view of a structure of the wireless energy transmission system according to a third embodiment of the present invention. The present invention further provides a wireless energy transmission system comprising a wireless energy transmission device 1 according to any one of said embodiments and a power supply device 2. The power supply device 2 is coupled to the signal feed-in part 110, and more specifically, the power supply device 2 is coupled to the hollow parts of the first and second slots of the signal feed-in part 110. The power supply device 2 is used to provide power for the operation of the wireless energy transmission device 1.

In an embodiment, the wireless energy transmission system further comprises an energy receiving device 3. The energy receiving device 3 is coupled to the wireless energy transmission device 1 and may be charged through an electromagnetic field produced by the wireless energy transmission device 1. There is no need for a wired connection through wires or other electrically conductive materials between the wireless energy transmission device 1 and the energy receiving device 3. Moreover, the angle at which the energy receiving device 3 is placed on the wireless energy transmission device 1 is not limited, and multiple energy receiving devices 3 can be charged by the wireless energy transmission device at the same time.

In an embodiment, the power supply device 2 may include components such as a radio frequency (RF) signal source and a power amplifier (PA), but not limited thereto. The energy receiving device 3 may be a mobile phone, remote controller, wearable device and so on, but not limited thereto. The energy receiving device 3 may also include components such as a rectifier, a boost charger, and a battery, but not limited thereto.

In summary, the wireless energy transmission device according to the present invention fabricates a coplanar waveguide by forming a signal feed-in part and an antenna part on the feed layer. The coplanar waveguide is used to introduce an energy transmission signal and produce an electromagnetic field. The wireless energy transmission device of the present invention may further adjust the gain of the antenna radiation gain pattern through the dielectric resonant component, so that the areas with higher gain would be concentrated in the space above the substrate. Therefore, the wireless charging can be performed by placing the energy receiving device above the wireless energy transmission device, and there is no need to pair the coils in the mobile device and the wireless charging pad as the wireless charging systems in the prior art do. In addition, the substrate, the feed layer, and the dielectric resonator component of the wireless energy transmission device of the present invention can all be made of light-transmitting materials, which is more beautiful and may enhance the design flexibility of the appearance of the wireless energy transmission device.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A wireless energy transmission device, comprising:
   a substrate;
   a feed layer being formed on the substrate and having a signal feed-in part and an antenna part formed on the feed layer, wherein the signal feed-in part is used to introduce an energy transmission signal and the energy transmission signal is emitted by the antenna part; and a dielectric resonant component disposed on the feed layer and covering the antenna part, the dielectric resonant component being configured to adjust an antenna radiation gain pattern in order to concentrate an area with a higher gain in a space above the substrate, wherein the dielectric resonant component has a transmittance of between 50% and 95%.

2. The wireless energy transmission device of claim 1, wherein the substrate has a transmittance of between 50% and 95%.

3. The wireless energy transmission device of claim 1, wherein the feed layer has a transmittance of between 50% and 95%.

4. The wireless energy transmission device of claim 1, wherein the substrate is made of acrylic.

5. The wireless energy transmission device of claim 1, wherein the substrate is made of glass or crystal glass.

6. The wireless energy transmission device of claim 1, wherein the feed layer is made of metal grid, ITO, graphene film or sputtered thin metal film.

7. The wireless energy transmission device of claim 1, wherein the dielectric resonant component is made of glass, crystal glass or acrylic.

8. The wireless energy transmission device of claim 1, wherein the signal feed-in part further comprises a first slot and a second slot, and the first slot and the second slot are substantially symmetrical to each other.

9. The wireless energy transmission device of claim 8, wherein the antenna part further comprises a third slot and a fourth slot, and the third slot and the fourth slot are substantially symmetrical to each other.

10. The wireless energy transmission device of claim 9, wherein the first slot, the second slot, the third slot and the fourth slot each has a cross-sectional area which is rectangular, the first slot is orthogonal to the third slot, and the second slot is orthogonal to the fourth slot.

11. The wireless energy transmission device of claim 1, wherein the dielectric resonant component has a shape of a cube, a cuboid, a cylinder, a half cylinder, a hollow cuboid or a hollow cylinder.

12. The wireless energy transmission device of claim 1, wherein a contact area between the dielectric resonant component and the feed layer is rectangular or circular.

13. The wireless energy transmission device of claim 12, wherein the antenna part substantially corresponds to a center position of the contact area.

14. The wireless energy transmission device of claim 1, wherein the dielectric resonant component has a dielectric constant of between 2 and 10.

15. A wireless energy transmission system, comprising:
the wireless energy transmission device according to claim 1; and
a power supply device coupled to the signal feed-in part and used to send the energy transmission signal to the signal feed-in part.

16. The wireless energy transmission system of claim 15, further comprising an energy receiving device coupled to the wireless energy transmission device and charged through an electromagnetic field produced by the wireless energy transmission device.

* * * * *